(12) United States Patent
Pelfrey

(10) Patent No.: US 7,445,213 B1
(45) Date of Patent: Nov. 4, 2008

(54) STEPPED LABYRINTH SEAL

(75) Inventor: Philip C. Pelfrey, Boca Raton, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 11/453,430

(22) Filed: Jun. 14, 2006

(51) Int. Cl.
F16J 15/447 (2006.01)

(52) U.S. Cl. .................. 277/418; 277/419; 277/420

(58) Field of Classification Search ......... 277/418–420; 415/174.5
See application file for complete search history.

(56) References Cited

U.S. PATENT DOCUMENTS

| 1,020,699 | A | | 3/1912 | Kleser | |
|---|---|---|---|---|---|
| 1,482,031 | A | | 1/1924 | Parsons et al. | |
| 1,831,242 | A | | 11/1931 | Hanzlik | |
| 2,123,818 | A | * | 7/1938 | Wegmann | 277/419 |
| 3,572,728 | A | * | 3/1971 | Smuland | 277/419 |
| 3,897,169 | A | | 7/1975 | Fowler | |
| 3,940,153 | A | | 2/1976 | Stocker | |
| 4,335,886 | A | | 6/1982 | Frey et al. | |
| 4,351,532 | A | * | 9/1982 | Laverty | 277/419 |
| 5,244,216 | A | | 9/1993 | Rhode | |
| 5,639,095 | A | * | 6/1997 | Rhode | 277/303 |
| 6,164,655 | A | | 12/2000 | Bthien et al. | |
| 6,276,692 | B1 | | 8/2001 | Beck et al. | |

* cited by examiner

Primary Examiner—Alison K Pickard
(74) Attorney, Agent, or Firm—John Ryznic

(57) ABSTRACT

A stepped labyrinth seal for a turbomachine, the seal having a stepped portion with a redirecting groove formed thereon to redirect a leakage flow through the gap in substantially a reverse direction and onto a surface of the finger such that the dynamic pressure of the leakage flow is not substantially reduced and the static pressure increased. The cavity formed between adjacent fingers has a flow guiding surface that maintains the dynamic pressure of the flow, thereby keeping the flow at high velocity and low static pressure.

9 Claims, 4 Drawing Sheets

STEPPED LABYRINTH SEAL

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

1. Field of the Invention

The present invention relates generally to a labyrinth seal, and more specifically to a labyrinth seal is a turbomachine.

2. Description of the Related Art including information disclosed under 37 CFR 1.97 and 1.98

Labyrinth seals are often used to reduce or control fluid leakage in systems having equipment such as gas and steam turbines, compressors, pumps, and other types of rotating equipment where fluid flow may occur between two relatively rotating members. More particularly, labyrinth seals are frequently used in sealing between elements such as a rotating shaft and an associated stator housing to inhibit undesirable fluid flow between the exterior of the shaft and interior of the stator. When incorporated with a pump, a labyrinth seal may be relied upon to inhibit leakage along the pump shaft of high pressure fluid being discharged by the pump.

A labyrinth seal is generally characterized by a series of cavities or grooves formed along the adjacent surfaces of two relatively rotatable members such as a rotor on a rotating shaft and a stator on an adjacent, fixed housing. These members generally define a partial barrier between areas of high and low fluid pressure. At successive stations along the length of the labyrinth seal, adjacent surfaces of the rotatable members are situated in close proximity to each other to define annular slit-like orifices. In many labyrinth seal designs, a series of cavities or chambers are formed at these stations in order to retard fluid flow through the seal to a desired level.

In operation, previously available labyrinth seal designs often form a fluid barrier between the rotatable members by forcing high velocity fluid to navigate irregularly spaced adjacent surfaces formed between the relatively rotatable members. The fluid is forced to pass sequentially through slit-like orifices to enter enlarged cavities where the fluid energy is largely dissipated in turbulence. One of the basic concepts of any labyrinth seal design is to create a highly frictional fluid flow path. Such a flow path will convert pressure energy into velocity energy. A large portion of the velocity energy will be dissipated as heat energy via turbulent action. The basic concept for this design is shown in the Prior Art FIG. 1. One problem with the straight-through labyrinth seals shown in FIG. 1 is the carry-over effect. A vortex 8 is created within the cavity of the labyrinth seal, and as the vortex increases in diameter the leakage flow though the gap will tend to not flow within the cavity, but flow straight toward the next gap. The effect of the labyrinth seal is reduced.

One source of turbulence is created as a result of wall shear friction between high velocity fluids and irregularly spaced adjacent surfaces of the seal. A second and often more important source of turbulence results from intense free shear layer friction between a high velocity fluid jet discharging from an orifice and relatively slow moving fluid in a large cavity immediately downstream from the orifice. As a result of the combination of these and other friction components, pressure energy is substantially reduce downstream of each orifice in a multi-cavity labyrinth seal system. The substantially reduced pressure in a given cavity formed downstream from a particular orifice results in smaller pressure changes occurring across additional downstream orifices. The net result is overall reduced leakage across the labyrinth seal.

In one Prior Art design, U.S. Pat. No. 1,482,031 issued to Parsons et al on Jan. 29, 1924 and entitled PACKING FOR ROTATING BODIES, a labyrinth seal is characterized by a radially stepped surface provided along the rotor, the stator being provided with a corresponding set of barrier members or collars disposed in close relationship thereto. In this fashion, high pressure fluid moving across the sealing surface will encounter interference; thus, minimizing leakage. In yet another design, U.S. Pat. No. 3,940,153 issued to Stocker on Feb. 24, 1976 and entitled LABYRINTH SEAL, the labyrinth seal is characterized by a succession of annular orifices or clearances between sealing teeth or knives on one member, and generally cylindrical surfaces or lands on the other. In combination, the sealing system defines a doubly re-curved flow path from each orifice to the orifice next downstream. This design is represented by the Prior Art FIG. 2.

Such prior art systems employ the use of sharp turns in the fluid flow path to provide additional fluid friction or resistance to flow. The through-flow fluid is forced to "zig-zag" or "serpentine" through the seal. The turning of the through-flow fluid in the prior art is often achieved through the use of wall positioning and wall curvature. Many of the prior art configurations were designed without precise quantitative data and without fully appreciating the kinetics involved in turbulence generation and energy dissipation associated with a sealing system. The concern of the prior art has generally been to increase the wall shear friction through the use of long and tortuous flow paths between each pair of annular orifices. By focusing on the use of wall shear stress, the prior art often neglected the turbulence generating potential of a free (i.e. away from wall) shear layer.

One problem associated with the stepped labyrinth seals is the carry-over effect described with respect to the FIG. 1 labyrinth seal. The vortex flow 8 can build up in the cavity of the stepped labyrinth seal. If the vortex flow is large enough, the carry-over effect will also occur within the stepped labyrinth seal. The leakage flow will be forced to flow from one gap to the next without passing into the cavity, and thus, the stepped labyrinth seal will act like the straight-through labyrinth seal of FIG. 1.

Another prior art design, U.S. Pat. No. 3,897,169 issued to Fowler in Jul. 29, 1975 and entitled LEAKAGE CONTROL STRUCTURE, which is represented in prior art FIG. 3, shows a stepped labyrinth seal with a first gap 324 formed between a first stepped portion 326 and a first fin 328 extending radial inward toward the first stepped portion 326, a second stepped portion 330 downstream from the first stepped portion 326 which includes a concave side surface 331, where the second stepped portion 330 is stepped or raised radially outward with respect to the outer surface stepped portion 326. a second fin 3332 forms a second gap 336 with the second stepped portion 330.

The difference between the present invention and the stepped labyrinth seals such as the Fowler design shown in the prior art FIG. 3 is that the side surface 331 has a concave surface in order to facilitate machining. However, side surface 331 could be flat or have other appropriate machined contours and function properly. The purpose of the side surface 331 in Fowler is for the kinetic energy of the fluid flow leakage through the gap 324 to be dissipated by the reaction of such leakage against the side surface 331. in operation, with the kinetic energy of the fluid leakage through gap 324 substantially dissipated by the side surface 331 and with the inclusion of the second fin 332, a back pressure sealing effect within the annular cavity 334 is created with respect to gap 324. as Fowler discloses above, the leakage flow passing in the first gap 324 is captured in the side surface 331 and brought to a rest (kinetic energy=zero), converting the dynamic head to a static head rise, representing a larger delta P. the pressure of the fluid downstream from the gap 324 is therefore high, resulting in more leakage flow through the downstream second gap 336.

Applicant's invention does not convert the kinetic energy into static energy as the leakage passes through the gap. The kinetic energy in the leakage flow is actually used to turn the flow about 180 degrees and guide the flow into the next cavity of the labyrinth seal assembly without slowing the flow.

BRIEF SUMMARY OF THE INVENTION

A stepped labyrinth seal used in a liquid or gaseous device in which the assembly includes a series of stepped portions that form gaps with fingers extending toward the stepped portions. Downstream from the gap is a curved surface that causes the leakage flow through the gap to be reversed in direction about 180 degrees and directed against a curved portion on the finger into the labyrinth cavity without slowing the leakage flow. The flow passes through a second gap and into a second curved surface to reverse the flow and direct the flow onto a curved surface of the second finger so that the leakage flow continues to flow without increasing pressure due to significant drop in the kinetic energy of the leakage flow through the stepped gaps. This flow reduces the carry-over effect which makes the Prior Art seals less effective. The present invention produces an improved stepped labyrinth seal over the prior art devices.

DETAILED DESCRIPTION OF THE INVENTION

Figure 1:
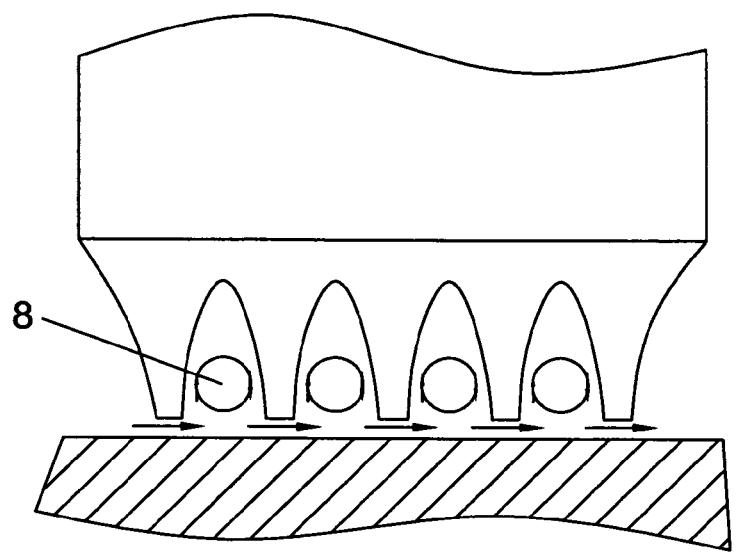
FIG. 1 shows a cross section view of a Prior Art labyrinth seal having a straight through configuration.
Figure 2:
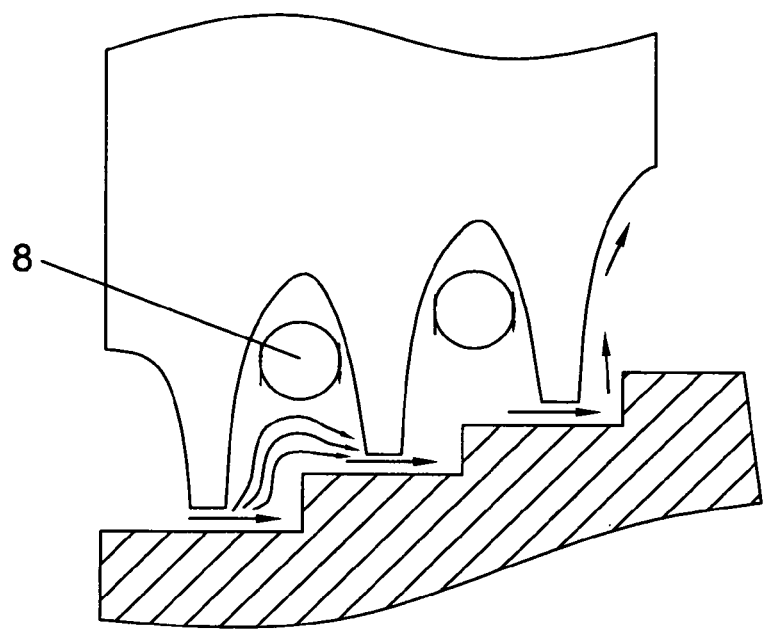
FIG. 2 shows a cross section view of a Prior Art labyrinth seal having a stepped configuration.
Figure 3:
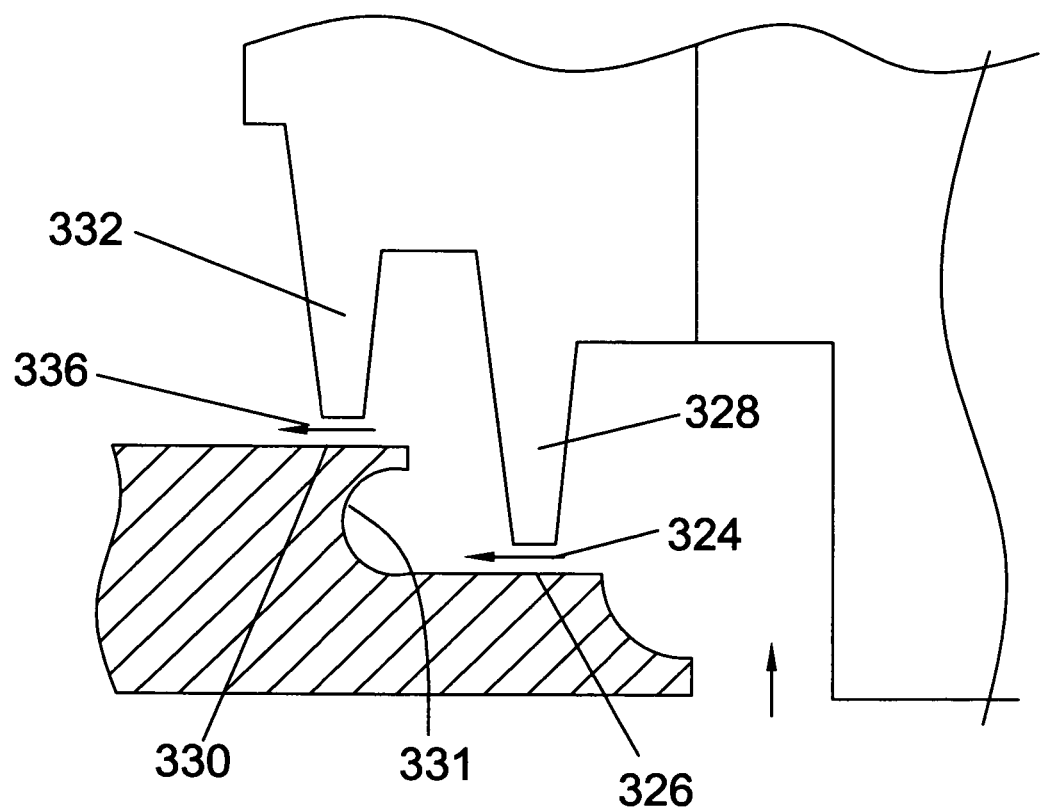
FIG. 3 shows a cross section view of a Prior Art labyrinth seal having a stepped configuration with a dam downstream of the seal gap.
Figure 4:
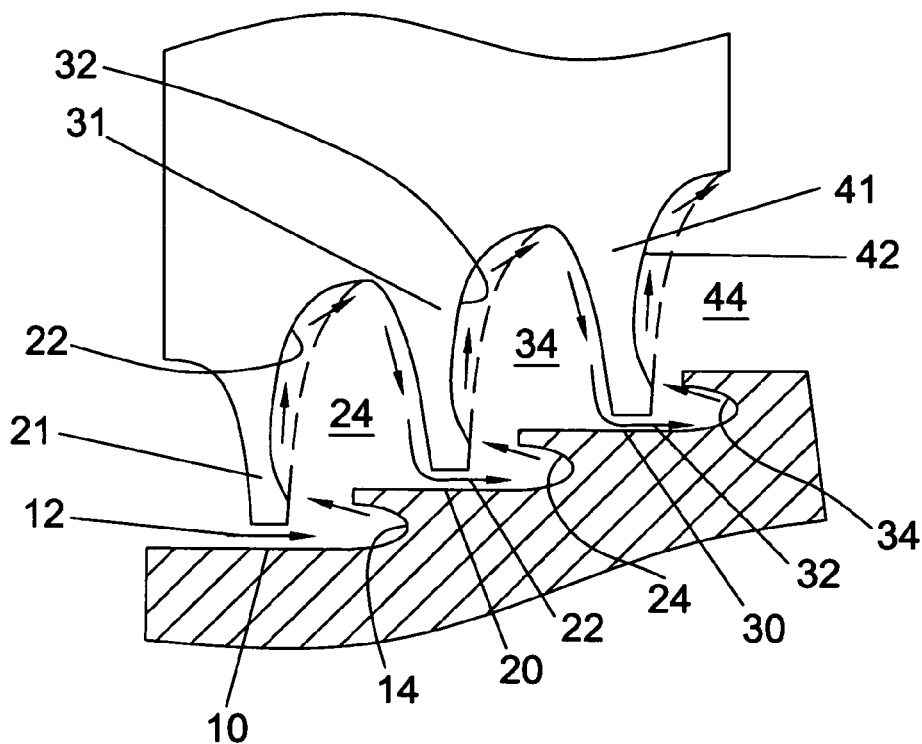
FIG. 4 shows a cross section view of the stepped labyrinth seal of the present invention.
Figure 5:
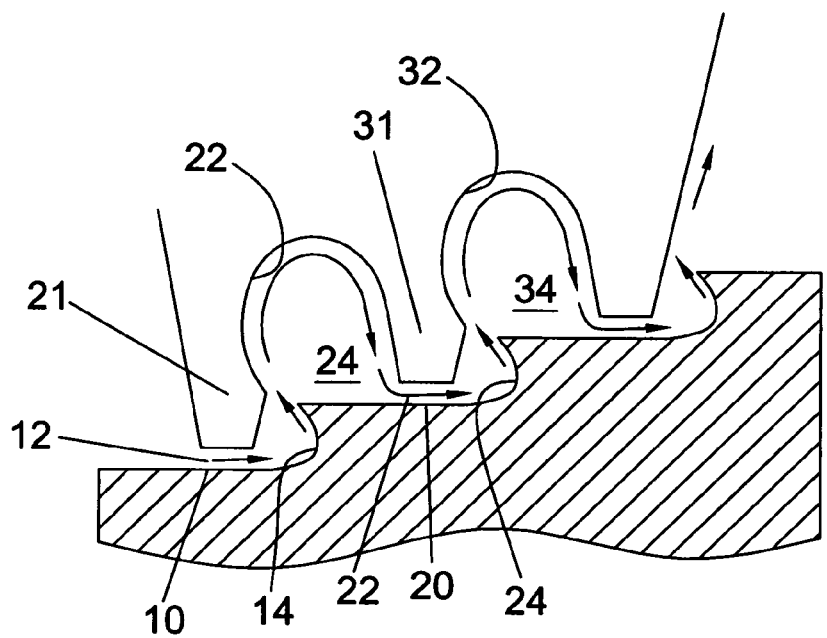
FIG. 5 shows a cross section view of a second embodiment of the present invention stepped labyrinth seal.

The stepped labyrinth seal of the present invention is shown in FIGS. 4 and 5. FIG. 4 shows a first embodiment in which a land (the rotating part with the plurality of fingers (21, 31, 41) rotates about a runner having the stepped portions (10, 20, 30). As an alternative to the first embodiment, the stepped portions could be the rotating part, while the fingers could be the stationary part without departing from the spirit of the present invention.

The land includes a plurality of fingers (21, 31, 41) extending there form and forming a gap 12 with the stepped portions (10, 20, 30) of the runner. A leakage flow first redirecting groove 14 is formed in the stepped portion 10 to redirect the flow. The first finger 21 of the land includes a first undercut portion 22 formed in the first finger 21 to receive the redirected flow from the first redirecting groove 14 for the purpose of passing the flow into the first cavity 24 without slowing the flow down such that the static pressure increases. This is the main feature that distinguishes the present invention from the Prior Art Fowler '169 invention. In Fowler, the leakage flow through the gap stalls at the groove and the pressure increases. In the present invention of FIG. 4, the flow continues in the cavity to the second finger 31 and second gap 22 that is formed with the second stepped portion 20. The flow passes through the second gap 22 and into the second redirecting groove 24 and toward the second finger 31. The second finger 31 also includes a second undercut portion 32 to receive the redirected flow and pass the flow into the second cavity 34. Flow from the second cavity 34 continues on through the third gap 32 formed between the third finger 41 and the third stepped portion 30 and into the third redirecting groove 34. The third finger 41 includes a third undercut portion 42 to receive the flow from the third redirecting groove 34, the purpose of which is to prevent the flow from slowing such that the pressure increases. This phenomenon reduces the carry-over effect, which makes the Prior Art seals less effective.

The redirecting grooves (14, 24, 34) are shown in FIG. 4 to redirect the leakage flow at slightly under a 180 degree turn. The turn could be at 180 degrees if desired. However, the undercut portions (22, 32, 42) in the fingers would have to be of such size and location as to prevent the redirected flow from damming up like in the Fowler '169 invention. The flow direction off of the second finger in the first cavity is more in the upstream direction of the flow through the second gap 22 than in the downstream or opposite direction.

The FIG. 5 embodiment of the present invention includes undercut portions (22, 32) in the fingers specifically sized and shaped for receiving the flow from the redirecting grooves (14, 24) and to pass on the flow through the cavity 24 and on to the next gap in the labyrinth seal. The angle at which the flow exits the redirecting groove 14 is such that the flow continues on toward the finger 21 without a decrease in pressure due to the flow slowing. In the FIG. 5 embodiment, the flow exits the redirecting cavity 14 and flows along the first undercut 22 of the first finger 21 and along the cavity wall, and exits the cavity wall at the end of the second finger 31, and then passes into the second gap 22. The flow process is repeated in the second cavity 34. The flow maintains a high velocity and a low static pressure through the cavity. The flow direction off of the second finger 31 in the first cavity 24 is more in the upstream direction of the flow through the second gap 22 than in the downstream or opposite direction as in the FIG. 4 embodiment.

Figure 6:
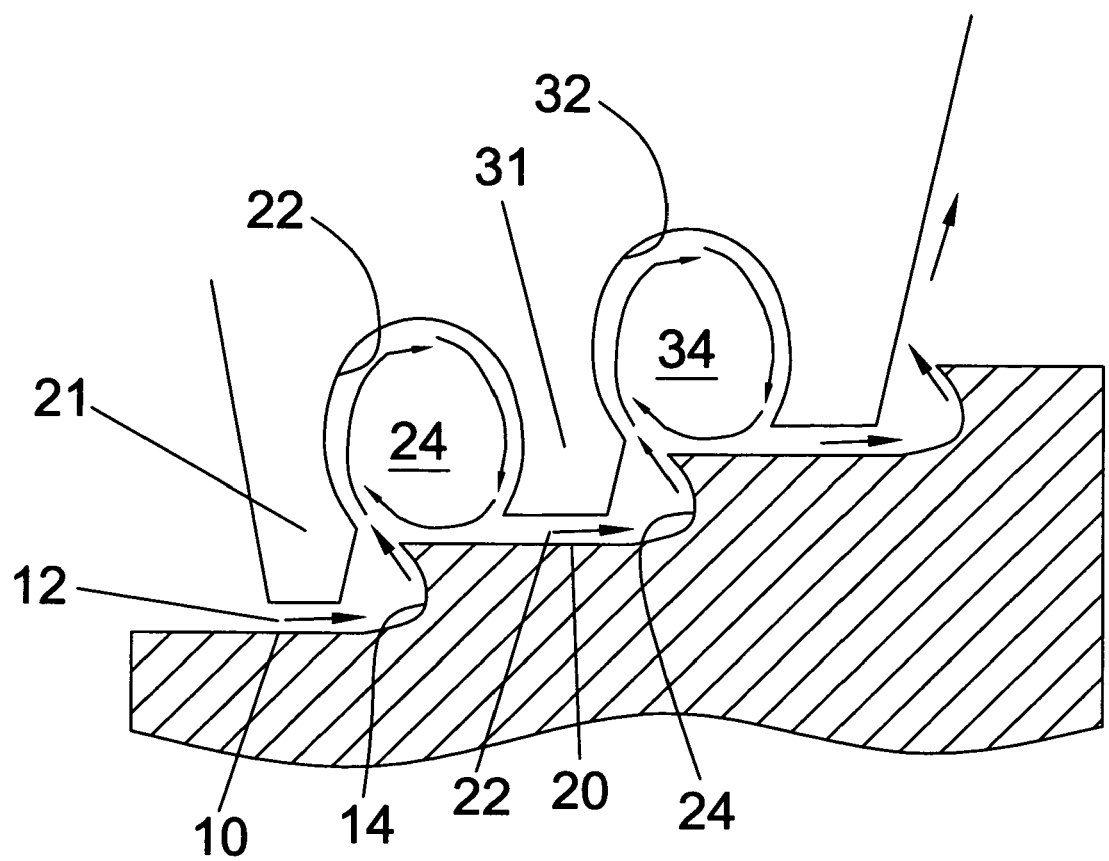
FIG. 6 shows a cross section view of a third embodiment of the present invention stepped labyrinth seal.

In the third embodiment of FIG. 6 of the present invention, the flow path within the cavity 24 directs the flow in a slightly rearward direction when the flow leaves the surface of the second finger 31. Instead of the flow being directed into the second gap 22 as in the FIG. 5 embodiment, the flow continues and forms a vortex flow within the cavity before flowing out of the cavity and into the gap downstream. The flow therefore maintains the high velocity and the low static pressure. The flow direction off of the second finger 31 in the first cavity 24 is more in the downstream direction of the flow through the second gap 22 than in the upstream or opposite direction.

In the present invention, the leakage flow along the surface of the cavity 24 is such that the flow is not blocked to increase the static pressure. The flow will lose energy along the surface due to normal viscosity or loses through friction. Providing for a smooth flowing surface from the redirecting groove 14 to maintain the dynamic pressure of the flow is what is defined as preventing the static pressure from substantially increasing.

In the present invention represented by the embodiments of FIGS. 4 through 6, the stepped labyrinth seal eliminates or reduces the vortex flow within the cavity that can cause the carry-over effect in a stepped labyrinth seal. An improved labyrinth seal results, and the overall performance of a turbomachine that uses the seal of the present invention improves as well.

I claim:

1. A stepped labyrinth seal, comprising:
   a stationary part having a stepped portion;
   a rotary part having a finger extending there from and toward the stepped portion, a gap being formed between the finger and the stepped portion;
   a redirecting groove formed in the stepped portion and located in a downstream flow direction from the gap;
   a flow receiving surface located on a backside of the finger, the flow receiving surface being aligned with the redirecting groove such that a flow from the exit of the redirecting groove flows along the flow receiving surface without substantial loss of dynamic pressure;
   the exit of the redirecting groove is at less than 180 degrees from the direction of the leakage flow from the upstream gap; and,
   a slope of the entrance of the flow receiving surface on the finger is substantially aligned with the exit of the redirecting groove.

2. The stepped labyrinth seal of claim 1, and further comprising:
   a cavity formed by the finger and an adjacent second finger, the cavity having a flow surface formed to guide the flow from the redirecting groove along a path to a location adjacent to a downstream gap with substantially no gain of static pressure.

3. The stepped labyrinth seal of claim 2, and further comprising:
   the flow surface formed on the second finger in the cavity having an exit direction for the flow more in the upstream direction of the flow than in the downstream direction.

4. The stepped labyrinth seal of claim 2, and further comprising:
   the flow surface formed on the second finger in the cavity having an exit direction for the flow more in the downstream direction of the flow than in the upstream direction such that the flow forms a vortex in the cavity.

5. A process for a sealing a stepped labyrinth seal between relatively moving parts, the labyrinth seal comprising a finger forming a leakage gap with a stepped portion of the labyrinth seal, the process comprising:
   redirecting a leakage flow through the gap in substantially an opposite direction at slightly under a 180 degree turn and without redirecting the leakage flow toward the gap; and,
   guiding the leakage flow from the redirected flow onto a surface of the finger such that the static pressure of the leakage flow remains substantially unchanged.

6. The process for a sealing a stepped labyrinth seal of claim 5, and further comprising the step of:
   guiding the leakage flow along a cavity formed between adjacent fingers to a location just upstream from a second gap such that the static pressure of the leakage flow along the cavity remains substantially unchanged.

7. The process for a sealing a stepped labyrinth seal of claim 6, and further comprising the step of:
   directing the flow in the cavity in a vortex pattern before discharging the flow through a second gap.

8. A stepped labyrinth seal, comprising:
   a stationary part having a stepped portion;
   a rotary part having a finger extending there from and toward the stepped portion, a gap being formed between the finger and the stepped portion;
   a redirecting groove formed in the stepped portion and located in a downstream flow direction from the gap;
   a flow receiving surface located on a backside of the finger, the flow receiving surface being aligned with the redirecting groove such that a flow from the exit of the redirecting groove flows along the flow receiving surface without substantial loss of dynamic pressure; and,
   the flow receiving surface located on a backside of the finger is an undercut with an inlet section inline with the outlet of the redirecting groove.

9. A stepped labyrinth seal, comprising:
   a stationary part having a stepped portion;
   a rotary part having a finger extending there from and toward the stepped portion, a gap being formed between the finger and the stepped portion;
   a redirecting groove formed in the stepped portion and located in a downstream flow direction from the gap;
   a flow receiving surface located on a backside of the finger, the flow receiving surface being aligned with the redirecting groove such that a flow from the exit of the redirecting groove flows along the flow receiving surface without substantial loss of dynamic pressure; and,
   the flow receiving surface located on the backside of the finger is offset from the tip of the finer such that the redirecting flow from the redirecting groove is not directed toward the gap and blocks the flow through the gap.

* * * * *